United States Patent
Gulikers et al.

(10) Patent No.: US 11,807,388 B2
(45) Date of Patent: Nov. 7, 2023

(54) APPARATUS, METHOD AND COMPUTER PROGRAM FOR MONITORING AN AIRCRAFT ENGINE

(71) Applicant: SAFRAN, Paris (FR)

(72) Inventors: Lennart Gulikers, Moissy-Cramayel (FR); Sébastien Philippe Razakarivony, Moissy-Cramayel (FR)

(73) Assignee: SAFRAN, Paris (FR)

( * ) Notice: Subject to any disclaimer, the term of this patent is extended or adjusted under 35 U.S.C. 154(b) by 0 days.

(21) Appl. No.: 17/765,309

(22) PCT Filed: Oct. 5, 2020

(86) PCT No.: PCT/FR2020/051741
§ 371 (c)(1),
(2) Date: Mar. 30, 2022

(87) PCT Pub. No.: WO2021/069824
PCT Pub. Date: Apr. 15, 2021

(65) Prior Publication Data
US 2022/0371745 A1    Nov. 24, 2022

(30) Foreign Application Priority Data
Oct. 7, 2019   (FR) ...................... 1911082

(51) Int. Cl.
*B64D 45/00* (2006.01)
*G05B 23/02* (2006.01)
*F02C 9/00* (2006.01)

(52) U.S. Cl.
CPC ............... *B64D 45/00* (2013.01); *F02C 9/00* (2013.01); *G05B 23/0254* (2013.01);
(Continued)

(58) Field of Classification Search
CPC ............ B64D 45/00; B64D 2045/0085; F05D 2270/44; F05D 2270/71; G05B 2219/45071; G05B 23/0254; F02C 9/00
See application file for complete search history.

(56) References Cited

U.S. PATENT DOCUMENTS 6,216,066 B1 * 4/2001 Goebel .............. G05B 23/0232
                                                                701/99
6,799,154 B1 * 9/2004 Aragones .............. G06F 11/008
                                                                703/22
(Continued)

FOREIGN PATENT DOCUMENTS

CA    2 881 700 A1    7/2014
FR    3 003 032 A1    9/2014
(Continued)

OTHER PUBLICATIONS

International Search Report for PCT/FR2020/051741, dated Jan. 13, 2021.

*Primary Examiner* — Mussa A Shaawat
(74) *Attorney, Agent, or Firm* — Sughrue Mion, PLLC

(57) ABSTRACT

A device for monitoring a state of a propulsion engine includes an acquisition module that acquires data of flights of the propulsion engine, comprising, for each flight, values of input variables, environment variables, and output variables of the propulsion engine during the flight, a learning module that computes, by learning from the data of each flight, an individual flight model for the flight, a using module that computes, for each flight, estimates of the values of the output variables, by applying the individual flight model to reference values of the input variables and the environment variables, and an error associated with the estimates of the values of the output variables that is obtained by applying the individual flight model to the reference values of the input variables and the environment (Continued)

variables. The reference values belong to a set of reference data, which are identical for the individual flight models.

11 Claims, 5 Drawing Sheets

(52) U.S. Cl.
CPC .. *B64D 2045/0085* (2013.01); *F05D 2270/44* (2013.01); *F05D 2270/71* (2013.01); *G05B 2219/45071* (2013.01)

(56) References Cited

U.S. PATENT DOCUMENTS

| | | | | |
|---|---|---|---|---|
| 6,823,675 | B2* | 11/2004 | Brunell | G05B 23/0291 60/773 |
| 6,832,205 | B1* | 12/2004 | Aragones | G06Q 10/06375 705/7.29 |
| 6,962,043 | B2* | 11/2005 | Venkateswaran | F01D 17/085 60/39.24 |
| 7,031,812 | B1* | 4/2006 | Pettigrew | B64C 27/06 701/14 |
| 7,062,370 | B2* | 6/2006 | Vhora | G05B 23/0281 701/33.9 |
| 7,286,923 | B2* | 10/2007 | Pomeroy | G01C 23/00 477/30 |
| 7,457,732 | B2* | 11/2008 | Aragones | G05B 17/02 703/2 |
| 8,600,917 | B1* | 12/2013 | Schimert | G06N 20/00 706/14 |
| 2002/0193933 | A1* | 12/2002 | Adibhatla | F02C 9/28 701/1 |
| 2004/0172228 | A1* | 9/2004 | Aragones | G05B 17/02 703/8 |
| 2005/0021212 | A1* | 1/2005 | Gayme | G06N 5/048 701/99 |
| 2005/0222747 | A1* | 10/2005 | Vhora | G05B 23/0254 701/31.4 |
| 2005/0261820 | A1* | 11/2005 | Feeney | G07C 5/0816 701/31.4 |
| 2009/0048730 | A1* | 2/2009 | Akkaram | G07C 5/006 701/31.4 |
| 2010/0082267 | A1* | 4/2010 | Schimert | G05B 19/4065 702/179 |
| 2011/0173496 | A1* | 7/2011 | Hosek | G07C 3/00 714/26 |
| 2015/0066430 | A1* | 3/2015 | Priori | G05B 23/0235 702/179 |
| 2017/0185937 | A1* | 6/2017 | Ricordeau | G05B 23/024 |
| 2017/0352204 | A1* | 12/2017 | Huet | B64D 45/00 |
| 2018/0170580 | A1 | 6/2018 | Gouby et al. | |
| 2018/0268288 | A1* | 9/2018 | Vandike | G05B 23/024 |
| 2018/0297718 | A1* | 10/2018 | Adibhatla | G07C 5/006 |
| 2018/0298817 | A1 | 10/2018 | Kalya et al. | |
| 2022/0185503 | A1* | 6/2022 | Razakarivony | G01M 15/044 |
| 2022/0242592 | A1* | 8/2022 | Razakarivony | B64F 5/60 |

FOREIGN PATENT DOCUMENTS

| | | |
|---|---|---|
| WO | 2005/120954 A3 | 12/2005 |
| WO | 2018/169605 A1 | 9/2018 |

* cited by examiner

- Acquired data $E1_j, ENV1_j, S1_j$
- — · — Model $f_i$
- ---- Estimation +/- modeling error CEM
- × Estimated outputs $S2_j$ $\varepsilon_i$ = Modeling error = estimation by the model (d'1+d'2+d'3) = EM = d'

APPARATUS, METHOD AND COMPUTER PROGRAM FOR MONITORING AN AIRCRAFT ENGINE

CROSS REFERENCE TO RELATED APPLICATIONS

This application is a National Stage of International Application No. PCT/FR2020/051741 filed Oct. 5, 2020, claiming priority based on French Patent Application No. 1911082 filed Oct. 7, 2019, the entire contents of each of which being herein incorporated by reference in their entireties.

The invention relates to a device, a method and a computer program for monitoring over time the state of at least one propulsion engine of at least one aircraft.

A field of application relates to aircraft such as airplanes and helicopters, the engines of which are monitored. These engines may be turbomachines.

A problem appearing on aircraft engines, is that the transfer function can change over time locally and the data available may not cover the entirety of the flight.

Often in the prior art the flight does not cover the entire operating envelope of the engine, and the use of an overall model and a comparison with the measured variables is not enough to monitor the engine.

Specifically, if a modification of the transfer function occurs in little explored or unexplored regions of the flight envelope, it is then difficult to observe it by comparison, due to the fact that the differences are submerged in noise or cannot be observed. The prior art consists in different methods, which are the monitoring of modeling parameters, the monitoring of residuals, or the monitoring of values of variables. The monitoring of modeling parameters is not robust to changes in the flight envelope, since the parameters may change without the engine state being affected. Residuals or variable values may also be affected by changes in the environment or in the inputs. Thus, the solutions of the prior art are not robust to external conditions. If there is no data or little data over a part of the flight envelope, it is possible that the residuals or parameters, estimated on data that are too remote, will not allow detection of the change of transfer function.

The invention aims to obtain a device, a method and a computer program for monitoring over time the state of at least one propulsion engine of at least one aircraft, which makes it possible to resolve the problem set out above.

For this purpose, a first subject matter of the invention is a device for monitoring over time a state of at least one propulsion engine of at least one aircraft, characterized in that the device comprises an acquisition module for acquiring data of flights of at least one propulsion engine of at least one aircraft, comprising, in association for each flight, values of input variables of the engine during the flight, values of environment variables of the engine during the flight and values of output variables of the engine during the flight, a learning module configured to compute by learning from the data of each flight an individual flight model for the flight, linking the input variables of the engine, the environment variables of the engine and the output variables of the engine, a using module for using individual flight models, configured to compute, for each flight:

estimates of the values of the output variables of the engine, which are obtained by applying the individual flight model to reference values of the input variables of the engine and to reference values of the environment variables of the engine, and an error associated with said estimates of the values of the output variables of the engine, which have been generated by the individual flight model and which have been obtained by applying the individual flight (V) model ($f_i$) to the reference values ($E_R$) of the input variables (E) of the engine (M) and to the reference values ($ENV_R$) of the environment variables (ENV) of the engine (M), wherein the reference values belong to a prescribed set of reference data, which are identical for the plurality of individual flight models.

Thanks to the invention, there is no need to have a parametric model or an existing global model. If the phenomenon to be detected covers a part of the space of the variables which is not covered or little covered during the analyzed flight, it is still possible to observe it by using the application of the individual flight models to the reference values. The invention thus enables to detect changes in the transfer function of the monitored engine which would not have been detected, and also enables to avoid false alarms. The advantage of the invention by comparison with the prior art is the ability to compare flights that do not have the same distribution of variables. The invention avoids making an interpretation error when comparing the models in two different envelopes. The invention allows comparison within one and the same envelope.

According to an embodiment of the invention, the device comprises at least one physical output for presenting information to a user, to supply an item of engine monitoring information for the flight which is determined by the using module at least from the estimates of the values of the output variables of the engine and from the error associated with these estimates and with the individual flight model.

According to an embodiment of the invention, the item of engine monitoring information for the flight is formed by the pair constituted by the estimates of the values of the output variables of the engine and the error associated with the estimates and with the individual flight model.

According to an embodiment of the invention, the error associated with the estimates and with the individual flight model comprises a distance computed between the values of the output variables of the engine, and estimates of the values of the output variables of the engine, computed by the individual flight model applied to the values of the input variables of the engine and to the values of the environment parameters of the engine, associated with the values of the output variables of the engine.

According to an embodiment of the invention, the error associated with the individual flight model comprises a distance computed between the reference values of the input variables of the engine associated with the reference values of the environment variables of the engine, and the values of the input variables of the engine associated with the values of the environment variables of the engine of the flight.

According to an embodiment of the invention, the learning module is configured to compute, by learning from the data of each flight, an estimate of modeling error of the individual flight model on the output variables of the engine, wherein the error associated with the individual flight model comprises said estimate of modeling error of the individual flight model.

According to an embodiment of the invention, at least some of the reference values of the reference input variables of the engine and/or of the reference values of the environment variables of the engine and/or of the reference values of the output variables of the engine are prescribed in association with one another in the prescribed set of reference data.

According to an embodiment of the invention, at least some of the reference values of the reference input variables of the engine and/or of the reference values of the environment variables of the engine and/or of the reference values of the output variables of the engine are flight data which have been obtained by the acquisition module for at least one flight carried out.

According to an embodiment of the invention, at least some of the reference values of the reference input variables of the engine and/or of the reference values of the environment variables of the engine and/or of the reference values of the output variables of the engine are flight data simulated for at least one flight not carried out.

A second subject matter of the invention is a method for monitoring over time a state of at least one propulsion engine of at least one aircraft, characterized by acquiring by an acquisition module data of flight of at least one propulsion engine of at least one aircraft, comprising, in association for each flight, values of input variables of the engine during the flight, values of environment variables of the engine during the flight and values of output variables of the engine during the flight, computing by a learning module from the data for each flight an individual flight model for the flight, which links the input variables of the engine, the environment variables of the engine and the output variables of the engine, computing by a using module using the individual flight models, for each flight:
estimates of the values of the output variables of the engine, which are obtained by applying the individual flight model to reference values of the input variables of the engine and to reference values of the environment variables of the engine, and
an error associated with said estimates of the values of the output variables of the engine, which have been generated by the individual flight model and which have been obtained by applying the individual flight model to the reference values of the input variables of the engine and to the reference values of the environment variables of the engine, wherein the reference values belong to a prescribed set of reference data which are identical for the plurality of the individual flight models.

A second subject matter of the invention is a computer program comprising code instructions for implementing the method for monitoring over time the state of at least one propulsion engine of at least one aircraft as described above, when it is implemented on a calculator.

The invention will be better understood on reading the following description, given solely by way of non-limiting example with reference to the figures of the appended drawings.

FIG. 1 schematically represents a part of a monitoring device according to an embodiment of the invention.

FIG. 2 schematically represents a part of the monitoring device according to an embodiment of the invention.

Figure 1:
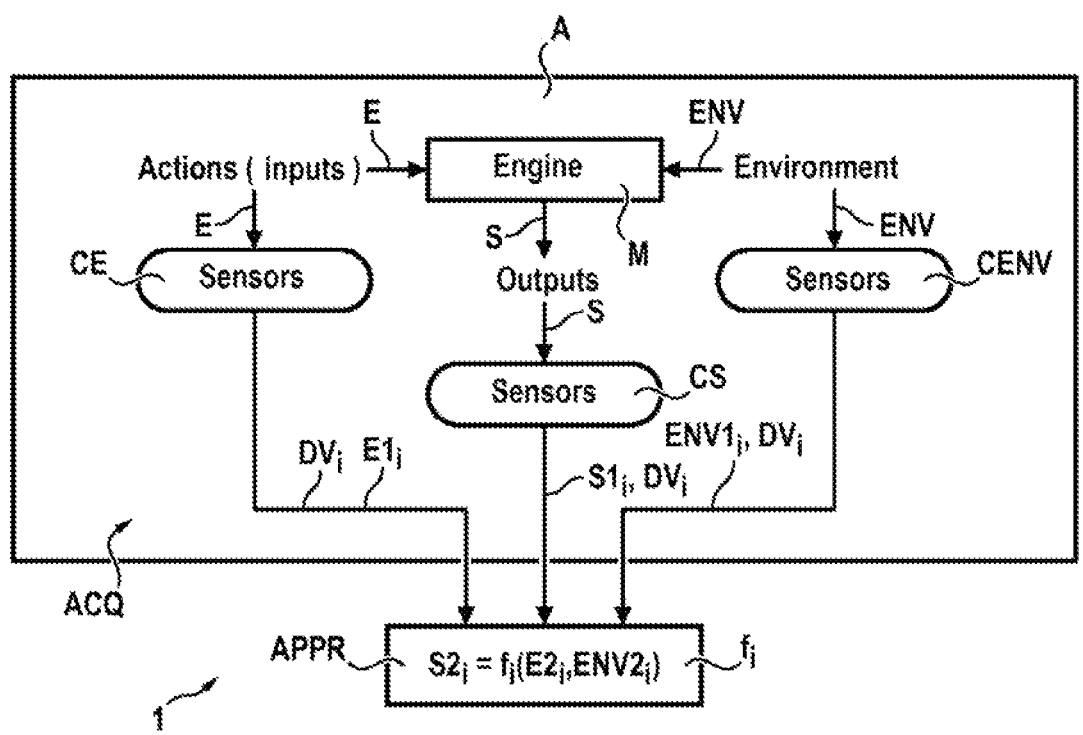
Figure 2:
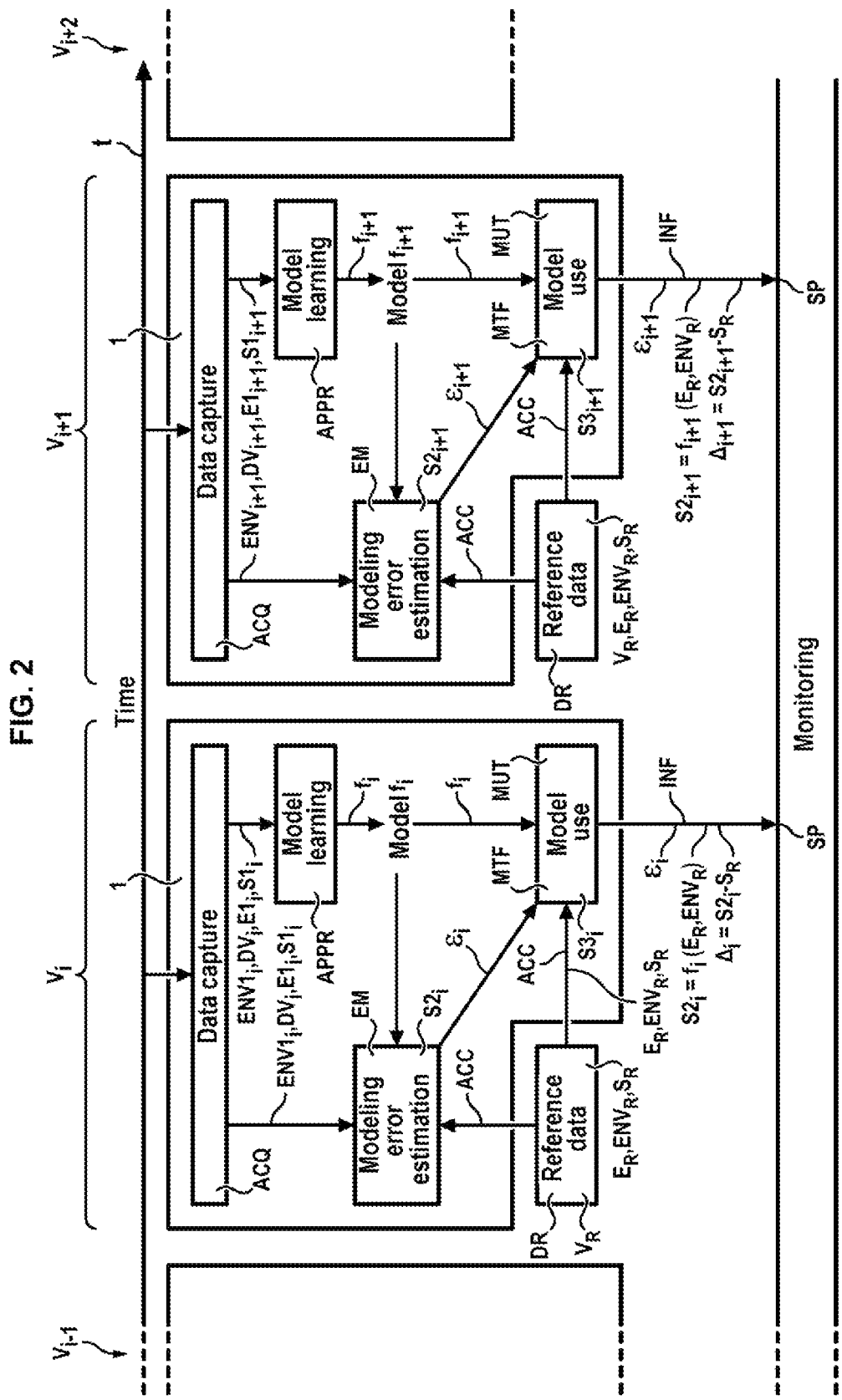

In FIGS. 1 and 2, the device 1 for monitoring over time the state of one or more propulsion engines M of an aircraft comprises a module ACQ for acquiring data $DV_i$ of the flights $V_i$ of the engine or engines M. This data $DV_i$ acquired from flights $V_i$ comprises:
values $E1_i$ of input variables E (physical quantities) of the engine M during the flight $V_i$,
values $ENV1_i$ of environment variables ENV (physical quantities) of the engine M during the flight $V_i$, and
values $S1_i$ of output variables S (physical quantities) of the engine M during the flight $V_i$.

The values $E1_i$, $ENV1_i$ and $S1_i$ are acquired during the flight $V_i$ and are associated with one another for each flight $V_i$ under consideration.

The acquisition module ACQ can be partly or totally comprised in the engine or engines M of the aircraft or in the aircraft. The aircraft can for example be an airplane or a helicopter. The propulsion engine M of the aircraft can be a turbomachine, such as for example a turbojet engine or others. The capturing module ACQ can comprise first sensors CE for measuring the values $E1_i$ of the input variables E of the engine during the flight $V_i$, and/or second sensors CENV for measuring the values $ENV1_i$ of the environment values ENV of the engine M during the flight $V_i$ and/or third sensors CS for measuring the values $S1_i$ of the output variables S of the engine M during the flight $V_i$.

The input variables E of the engine are control variables on which controls of the aircraft pilot can operate to control the engine. The input variables E of the engine may for example comprise a rotation speed of the engine M and/or a command of the pilot sent to the engine M and/or a control torque of the engine M and/or others. The environment variables ENV of the engine M are external variables of the engine M and are not controllable, and may for example comprise an external temperature and/or an external pressure and/or a humidity rate and/or a presence of contamination and/or others. The output variables S of the engine M are variables resulting from the input variables E and the environment variables ENV and may for example comprise a temperature of the engine M and/or a rotational torque of the engine M and/or an instantaneous fuel consumption of the engine M and/or others.

The acquisition module ACQ can for example register in an embedded memory of the aircraft, for example in its embedded electronic control unit or in an embedded unit of the aircraft, the data $DV_i$ of flights $V_i$ comprising the values $E1_i$, $ENV1_i$ and $S1_i$ mentioned above. The data $DV_i$ of flights $V_i$ can be extracted from the memory on the ground after each flight $V_i$ to be sent to the other modules described below of the monitoring device 1.

As illustrated in FIG. 2, the monitoring device 1 comprises a learning module APPR enabling to generate for each flight $V_i$ an individual flight model $f_i$. The learning module APPR thus enables to compute several individual flight models $f_i$ for several successive flights $V_i$, $V_{i+1}$ over the time t. In FIGS. 1 and 2, the subscript i relates to the flight $V_i$ and therefore the time. The learning module APPR is configured to compute by learning from the data $DV_i$, $E1_i$, $ENV1_i$ and $S1_i$ of each flight $V_i$ the individual flight model $f_i$, linking for this flight $V_i$ the input variables E of the engine M, the environment values ENV of the engine M and the output variables S of the engine M. The data $DV_i$, $E1_i$, $ENV1_i$ and $S1_i$ are learning data of the module $f_i$. The model learning module APPR learns the model $f_i$ linking the inputs E, the flight variables ENV and the outputs S using the newly acquired data and where applicable a portion of the past data. The portion of past data can be determined by a sliding time window, or else any other device weighting the different data of the preceding flights.

According to an embodiment of the invention, in general for any second values $E2_i$ of the engine input variables E of the flight $V_i$ and second values $ENV2i$ of the environment variables ENV, each individual flight V model $f_i$ enables to compute by the module APPR estimates of the values $S2_i=f_i(E2_i, ENV2_i)$ of the output variables S of the engine of the flight $V_i$ as a function of these second values $E2i$ and $ENV2_i$ of the environment variables ENV of the flight $V_i$ (or conversely), such that, when for the flight $V_i$ the second values $E2_i$, $ENV2_i$ of the input variables E of the engine and of the environment variables ENV of the engine are equal to the first values $E1_i$, $ENV1_i$ of the input variables E of the engine and of the environment variables ENV of the engine M, the second values S2 of the output variables S of the engine M approach or are substantially equal to the first values $S1_i$ of the output variables S of the engine M for the flight $V_i$. The first values $E1_i$, $ENV1_i$, Si of the input variables E of the engine, the environment variables ENV of the engine M and the output variables S of the engine M are a set of learning data of the individual flight model $f_i$. For example, in the following text, the models $f_i$ can be used only on the reference variables, $ENV_R$ and $E_R$. The monitoring device 1 comprises a using module MUT for using the individual models $f_i$ of the flight $V_i$, which have been computed by the learning module APPR. The using module MUT is configured to compute, for each flight $V_i$, the estimates of the values $S2_i=f_i(E_R, ENV_R)$ of the output variables S of the engine corresponding to the reference values $E_R$ of the input variables of the engine M and to the reference values $ENV_R$ of the environment variables ENV of the engine M. These estimates of the values $S2_i=f_i(E_R, ENV_R)$ are therefore computed by the using module MUT applying the individual model $f_i$ of the flight $V_i$ to the reference values $E_R$ of the input variables E of the engine M and to the reference values $ENV_R$ of the environment variables ENV of the engine M. The reference values $E_R$, $ENV_R$ belong to a prescribed set of reference data DR which are identical for the plurality i of the individual flight $V_i$ models $f_i$. The using module MUT comprises an access ACC making it possible to prescribe or input the reference data DR. The using module MUT of the model $f_i$ applies the model $f_i$ to a set DR of reference data (flight variables $ENV_R$, input variables $E_R$). This reference set DR can be previously stored data, or simulated data. This fixed reference set DR can be one or more past flights, or one or more simulated flights, or finally one or more specific points of the validity space of the learnt model $f_i$. The model-using module MUT comprises as inputs the model $f_i$ and the reference data DR and as output estimates of physical quantities. The reference set DR makes it possible to compare several models $f_i$, learnt under different conditions.

According to an embodiment of the invention, the individual flight $V_i$ model $f_i$ uses an algorithm that can be any regressive algorithm such as a linear regression, or a gaussian process, or a linear gaussian process, or a random forest, or a neural network, or a regression by least squares or a polynomial regression of order higher than or equal to 2, this algorithm linking the computed values of the output variables S of the engine M to the values of the input variables E of the engine M and to the environment variables ENV of the engine M. The model MUT estimates the reliability of the model, by comparing the learning set and the reference set DR, and/or by using the learning error. In the first case, a possible exemplary embodiment is the use of a regressive method supplying such an estimate, such as gaussian processes or any other probabilistic method. Another possibility is to use the distance between the two sets, such as the Chamfer distance. For the learning error, it is possible to use any estimating technique, such as for example to test the model on a set of data not used during the learning (this set is often known as the validation set in the prior art).

According to another embodiment of the invention, the individual flight $V_i$ model $f_i$ can link the computed values of the output variables S of the engine M to the values of the input variables E of the engine M and to the environment variables ENV of the engine M.

The using module MUT is configured to also compute, for each flight $V_i$, an error $\varepsilon_i$ associated with the estimates of output values S computed by the individual flight $V_i$ model $f_i$. This error $\varepsilon_i$ is therefore computed by the using module MUT from the individual flight $V_i$ model $f_i$.

The monitoring information INF described below or the estimates of the values $S2_i=f_i(E_R, ENV_R)$ of the output variables S associated with the error $\varepsilon_i$ allow the user to monitor each flight $V_i$ one after the other and to be able to observe drifts or abnormal phenomena of the flight $V_i$. For example, the using module MUT is configured to monitor whether or not the second values $S2_i$ are increasing then decreasing between the flights $V_{i-1}$, $V_i$, $V_{i+1}$ and whether or not the associated error ci remains low (the associated error $\varepsilon_i$ remains below a prescribed threshold), so that if both these conditions are fulfilled at once, it automatically triggers a warning on one or more physical outputs SP for presenting information to a user (display screen and/or others), this warning indicating that there is a problem with the monitored engine M or with the aircraft having this monitored engine M. The device and the monitoring method according to the invention can be used to compare the different models $f_i$ with one another, using the models $f_i$ over the reference set.

The monitoring device 1 can comprise one or more physical outputs SP for presenting information to a user (display screen and/or other screen), to supply the item of monitoring information INF of the engine for the flight $V_i$. This item of monitoring information INF is determined by the using module MUT at least on the basis of the second values $S2_i=f_i(ER, ENVR)$ of the output variables S of the engine that have been computed and from the error $\varepsilon_i$ associated with the individual flight $V_i$ model $f_i$ having been computed. For example, this item of information INF is the pair ($S2_i$, $\varepsilon_i$). The device 1 can comprise a module for automatic monitoring of breaks, trends and anomalies in the pair ($S2_i$, $\varepsilon_i$), implemented by an electronic control unit and having as inputs the estimates of physical quantities and the error estimates, and as outputs: an item of information INF reporting breaks and/or trends and/or anomalies. As a variant, the user can also use a visual approach, to observe trends, anomalies and breaks, or any algorithm for automatic monitoring of time series, implemented by a calculator. As a function of the result of this monitoring, a maintenance operation or an advisory message concerning the use of the monitored engine M can be issued to the customer operating the monitored engine M and/or the aircraft.

Figure 3:
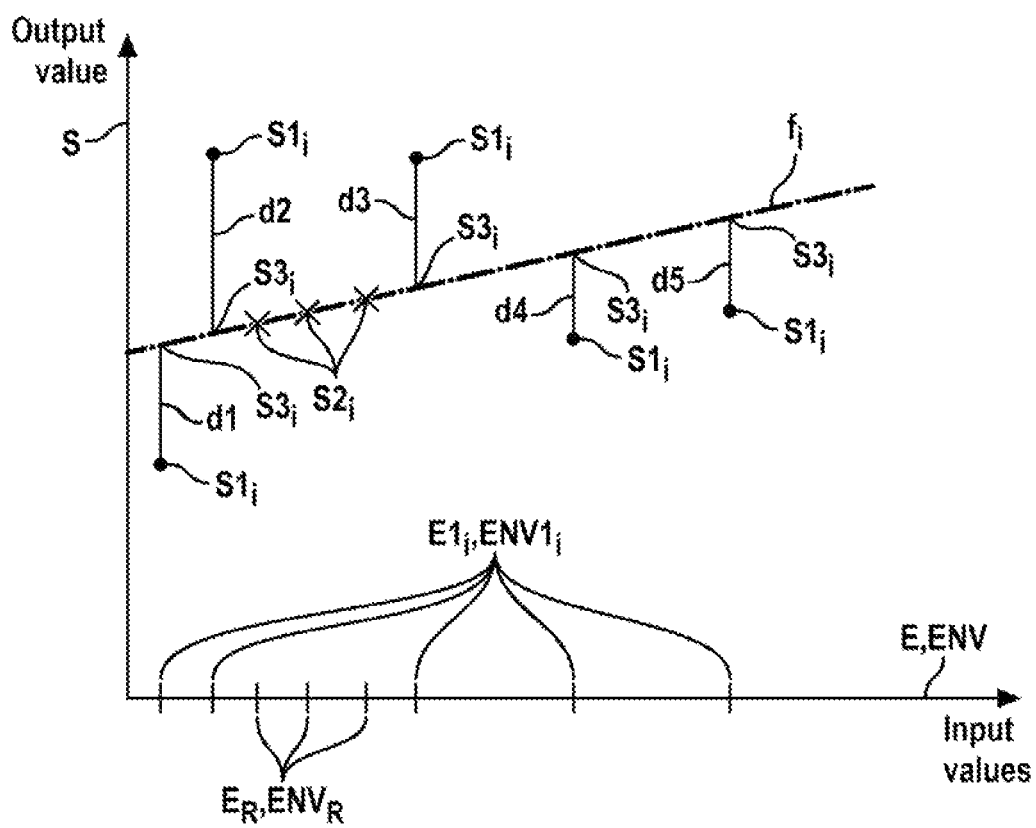
FIG. 3 represents a diagram showing outputs of a model computed by the monitoring device according to an embodiment of the invention on the ordinate, as a function of the inputs of the model on the abscissa.

According to an embodiment of the invention, illustrated in FIG. 3, the error $\varepsilon_i$ comprises or is a distance d computed between:
- the values $S1_i$ of the output variables S of the engine M, and
- estimates of the values $S3_i$ of the output variables S of the engine M, which are computed by applying the individual flight $V_i$ model $f_i$ to the first values $E1_i$ of the input variables E of the engine and to the first values $ENV1_i$ of the environment variables ENV of the engine M, associated with the first values $S1_i$ of the output variables S of the engine M. This distance d can be computed as being the average of the individual distances d1, d2, d3, d4, d5 between each first value $S1_i$ and each third value $S3_i$. For example, this error $\varepsilon_i$ can be computed by assuming that the first values ENV of the environment variables ENV are the same for the different values $E1_i$ and $S1_i$. For example, in FIG. 3, the model $f_i$ of the individual flight $V_i$ can be a linear regression linking the second output values $S2_i$ to the first values $E_R$ $ENV_R$ and linking the third output values S3i to the first values $E1_i$, $ENV1_i$.

Figure 4:
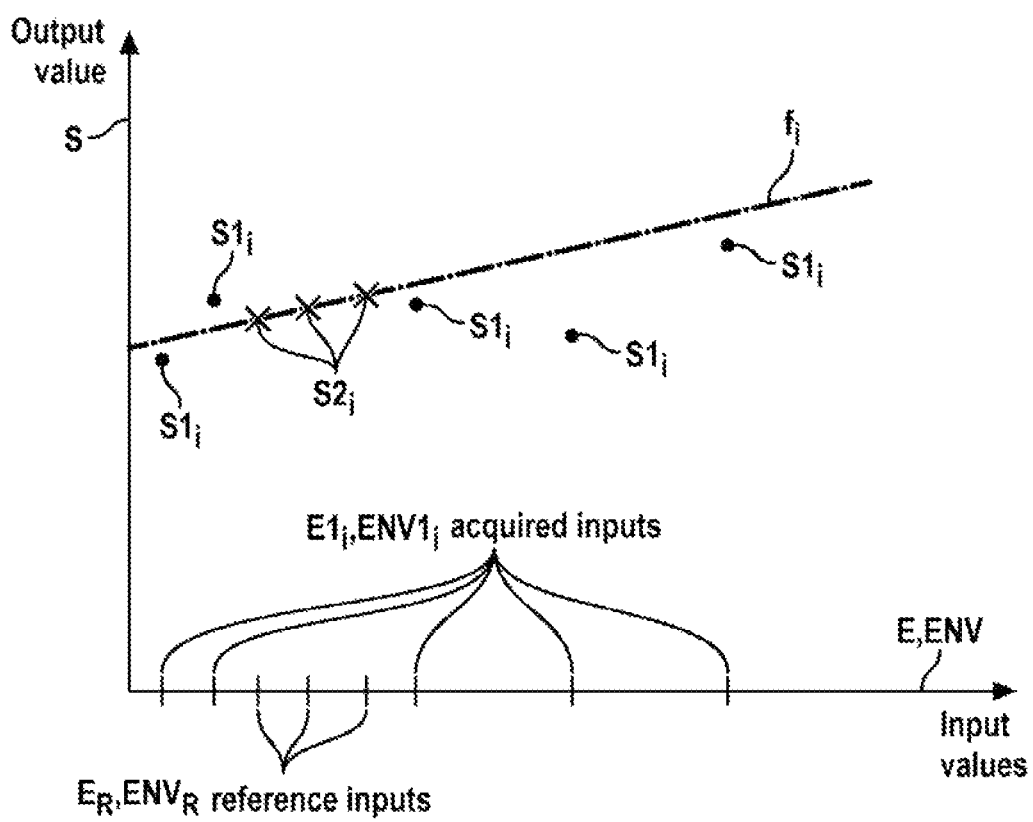
FIG. 4 represents a diagram showing outputs of a model computed by the monitoring device according to another embodiment of the invention on the ordinate, as a function of the inputs of the model on the abscissa.

According to an embodiment of the invention, illustrated in FIG. 4, the error $\varepsilon_i$ associated with the individual model $f_i$ of the flight $V_i$ comprises or is a distance $d(E_R, E1_i)$ computed between
- the reference values $E_R$ of the input variables E of the engine M, and
- the first values $E1i$ of input variables E of the engine.

This distance $d(E_R, E1_i)$ may be a distance between sets of points, for example a Hausdorff distance. For example, this error $\varepsilon_i$ may be computed by assuming that the first values $ENV1_i$ of the environment variables ENV are the same for the different values $E1_i$ and $S1_i$. For example, in FIG. 4, the individual flight $V_i$ model $f_i$ can be a linear regression linking the second output values $S2_i$ to the first values $E_R$, $ENV_R$ and linking the third output values Sa to the first values $E1_i$, $ENV1_i$.

Figure 5:
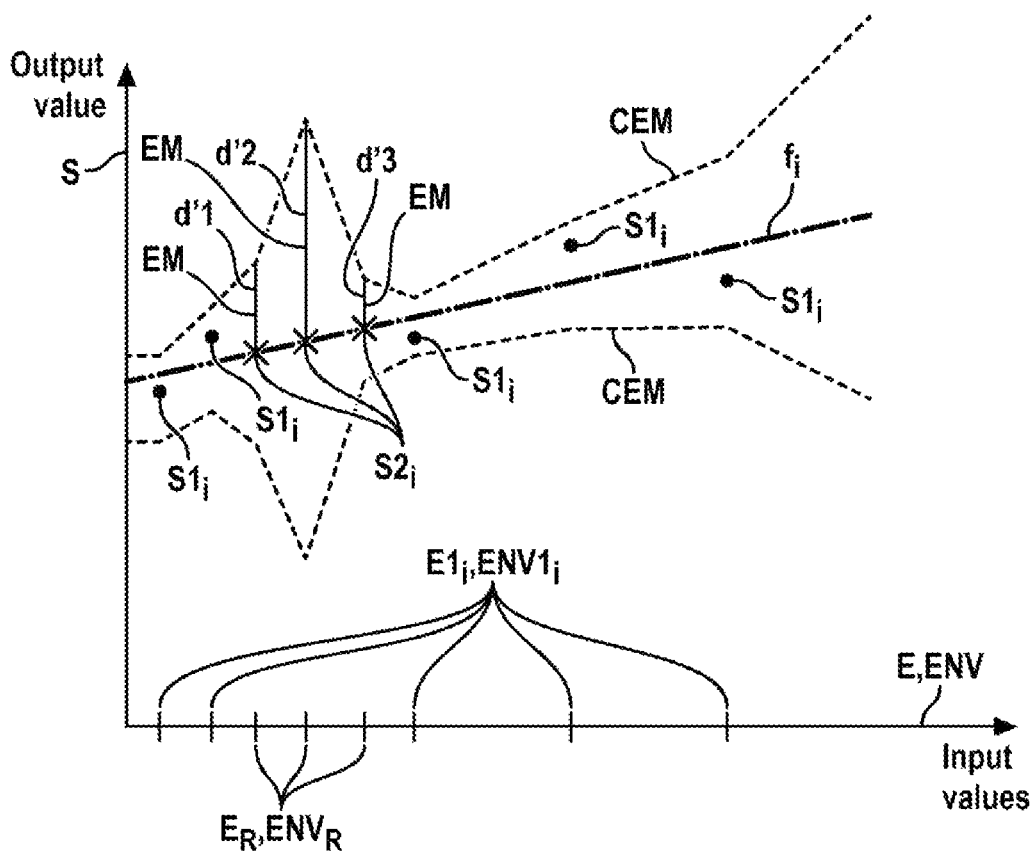
FIG. 5 represents a diagram showing outputs of a model computed by the monitoring device according to another embodiment of the invention on the ordinate, as a function of the inputs of the model on the abscissa.

According to an embodiment of the invention, illustrated in FIG. 5, the learning module APPR is configured to compute by learning, based on the first data DV of each flight $V_i$, an estimate EM of the modeling error of the individual flight model $f_i$ on the output variables S of the engine M.

The error $\varepsilon_i$ associated with the individual model $f_i$ of the flight $V_i$ comprises or is this estimate EM of the modeling error of the individual flight model $f_i$. The learning module APPR can be configured to compute by learning, on the basis of the first data $DV_i$ of each $V_i$, an estimate EM of the modeling error of the individual flight model $f_i$ on the output variables S of the engine M, as illustrated in FIGS. 2 and 5.

According to an embodiment of the invention, illustrated in FIG. 5, the estimate EM of the modeling error of the individual flight model $f_i$ on the output variables S of the engine M comprises or is a distance d' computed between
- an error CEM computed as a function of the first values $E1_i$ of the input variables E of the engine and/or of the first values $ENV1_i$ of the environment variables ENV of the engine M, and
- the estimates of the values $S2_i$ of the output variables S of the engine M, which are computed by applying the individual model $f_i$ of the flight $V_i$ to the reference values $E_R$ of the input variables E of the engine M and to the reference values $ENV_R$ of the environment variables ENV of the engine M. This distance d' may be computed as being the average of the individual distances d'1, d'2, d'3 between each second value $S2i$ and the error. For example, this estimate EM of the modeling error can be computed by assuming that the first values $ENV1_i$ of the environment variables ENV are the same for the different values $E_R$ and $ENV_R$. For example, in FIG. 5, the individual model $f_i$ of the flight $V_i$ can be a regression with a linear gaussian process, linking the second output values $S2_i$ to the first values $E_R$, $ENV_R$ and linking the third output values $S3_i$ to the first values $E1i$, $ENV1_i$.

According to an embodiment of the invention, at least some (or all) of the reference values $E_R$ and/or at least some (or all) of the reference values $ENV_R$ and/or at least some (or all) of the reference values $S_R$ are prescribed in association with one another in the prescribed set of reference data DR.

According to an embodiment of the invention, at least some (or all) of the reference values $E_R$ and/or at least some (or all) of the reference values $ENV_R$ and/or at least some (or all) of the reference values $S_R$ are first flight data DV which have been obtained by the acquisition module ACQ for at least one flight $V_i$ made. In other words, the reference flight or flights $V_R$ may be one or more flights $V_i$ made.

According to an embodiment of the invention, at least some (or all) of the reference values $E_R$ and/or at least some (or all) of the reference values $ENV_R$ and/or at least some (or all) of the reference values $S_R$ are first flight data DV which have been simulated for at least one flight $V_i$ not actually made by the aircraft. In other words, the reference flight or flights $V_R$ may be one or more flights $V_i$ simulated and not actually taken by the aircraft.

Figure 6:
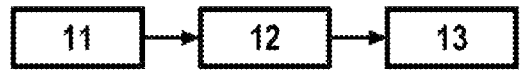
FIG. 6 represents a flow chart of a monitoring method according to the invention.

The monitoring device 1 enables to implement a method for monitoring over time the state of at least one propulsion engine M of at least one aircraft A, which comprises the steps described below with reference to FIG. 6. These steps are automatically executed by the monitoring device 1.

During a first step 11, acquisition of the data $DV_i$ described above is carried out by the acquisition module ACQ.

During a second step 12 subsequent to the first step 11, the individual flight model $f_i$ described above is computed by the learning module APPR.

During a third step 13 subsequent to the second step 12 or simultaneous with the second step 12, the second values $S2_i=f_i(E_R, ENV_R)$ and the error $\varepsilon_i$ associated with S2i and with the individual flight $V_i$ model ($f_i$) are computed by the module MUT for using the individual models $f_i$ of flights $V_i$ for each flight $V_i$, as described above.

The monitoring method can implement one and/or the other of the embodiments described above.

The monitoring device 1 and its modules APPR, MUT, MTF can be implemented by one or more calculators, such as for example one or more computers, or other computing means. The monitoring device 1 can comprise a computer program, stored in a permanent memory thereof, to implement the modules APPR, MUT, MTF and to execute the steps of the monitoring method.

Of course, the embodiments, features, possibilities and examples described above can be combined with one another or be selected independently of one another.

The invention claimed is:

1. A device for monitoring over time a state of at least one propulsion engine of at least one aircraft, wherein the device comprises a memory storing a computer program and one or more computers configured to access the memory and execute the computer program to implement at least:
   an acquisition module for acquiring data of flights of the at least one propulsion engine of the at least one aircraft, comprising, in association for each flight, values of input variables of the at least one propulsion engine during the flight, values of environment variables of the at least one propulsion engine during the flight and values of output variables of the at least one propulsion engine during the flight, a learning module configured to compute by learning from the data of each flight an individual flight model for the flight, linking the input variables of the at least one propulsion engine, the environment variables of the at least one propulsion engine and the output variables of the at least one propulsion engine, a using module for using individual flight models, configured to compute, for each flight:

estimates of the values of the output variables of the at least one propulsion engine, which are obtained by applying the individual flight model to reference values of the input variables of the at least one propulsion engine and to reference values of the environment variables of the at least one propulsion engine, and an error associated with the estimates of the values of the output variables of the at least one propulsion engine, which have been generated by the individual flight model and which have been obtained by applying the individual flight model to the reference values of the input variables of the at least one propulsion engine and to the reference values of the environment variables of the at least one propulsion engine, wherein the reference values belong to a prescribed set of reference data, which are identical for the plurality of individual flight models.

2. The device as claimed in claim 1, comprising at least one physical output for presenting information to a user, to supply an item of engine monitoring information for the flight which is determined by the using module at least from the estimates of the values of the output variables of the at least one propulsion engine and from the error associated with the estimates and with the individual flight model.

3. The device as claimed in claim 2, wherein the item of engine monitoring information for the flight is formed by the pair constituted by the estimates of the values of the output variables of the at least one propulsion engine and the error associated with the estimates and with the individual flight model.

4. The device as claimed in claim 1, wherein the error associated with the estimates and with the individual flight model comprises a distance computed between the values of the output variables of the at least one propulsion engine and estimates of the values of the output variables of the at least one propulsion engine, computed by the individual flight model applied to the values of the input variables of the at least one propulsion engine and to the values of the environment parameters of the at least one propulsion engine, associated with the values of the output variables of the at least one propulsion engine.

5. The device as claimed in claim 1, wherein the error associated with the individual flight model comprises a distance computed between the reference values of the input variables of the at least one propulsion engine associated with the reference values of the environment variables of the at least one propulsion engine and the values of the input variables of the at least one propulsion engine associated with the values of the environment variables of the at least one propulsion engine of the flight.

6. The device as claimed in claim 1, wherein the learning module is configured to compute, by learning from the data of each flight, an estimate of modeling error of the individual flight model on the output variables of the at least one propulsion engine, wherein the error associated with the individual flight model comprises the estimate of modeling error of the individual flight model.

7. The device as claimed in claim 1, wherein at least some of the reference values of the reference input variables of the at least one propulsion engine and/or of the reference values of the environment variables of the at least one propulsion engine and/or of the reference values of the output variables of the at least one propulsion engine are prescribed in association with one another in the prescribed set of reference data.

8. The device as claimed in claim 1, wherein at least some of the reference values of the reference input variables of the at least one propulsion engine and/or of the reference values of the environment variables of the at least one propulsion engine and/or of the reference values of the output variables of the at least one propulsion engine are flight data which have been obtained by the acquisition module for at least one flight carried out.

9. The device as claimed in claim 1, wherein at least some of the reference values of the reference input variables of the at least one propulsion engine and/or of the reference values of the environment variables of the at least one propulsion engine and/or of the reference values of the output variables of the at least one propulsion engine are flight data simulated for at least one flight not carried out.

10. A method for monitoring over time a state of at least one propulsion engine of at least one aircraft, the method comprising:

acquiring, by an acquisition module executed by one or more computers, data of flight of the at least one propulsion engine of the at least one aircraft, comprising, in association for each flight, values of input variables of the at least one propulsion engine during the flight, values of environment variables of the at least one propulsion engine during the flight and values of output variables of the at least one propulsion engine during the flight, computing, by a learning module executed by the one or more computers, from the data for each flight an individual flight model for the flight, which links the input variables of the at least one propulsion engine, the environment variables of the at least one propulsion engine and the output variables of the at least one propulsion engine, and computing, by a using module executed by the one or more computers, using the individual flight models, for each flight:

estimates of the values of the output variables of the at least one propulsion engine, which are obtained by applying the individual flight model to reference values of the input variables of the at least one propulsion engine and to reference values of the environment variables of the at least one propulsion engine, and an error associated with the estimates of the values of the output variables of the at least one propulsion engine, which have been generated by the individual flight model and which have been obtained by applying the individual flight model to the reference values of the input variables of the at least one propulsion engine and to the reference values of the environment variables of the at least one propulsion engine, wherein the reference values belong to a prescribed set of reference data which are identical for the plurality of the individual flight models.

11. A non-transitory computer readable storage medium storing computer program code which, when executed by one or more computers, causes the one or more computers to implement the method for monitoring over time a state of at least one propulsion engine of at least one aircraft as claimed in claim 10.

* * * * *